United States Patent
Togashi

(10) Patent No.: US 9,025,306 B2
(45) Date of Patent: May 5, 2015

(54) LAMINATED CAPACITOR HAVING INTERNAL ELECTRODE CONNECTED TO TERMINAL ELECTRODE AND INTERNAL ELECTRODE NOT CONNECTED TO TERMINAL ELECTRODE

(71) Applicant: TDK Corporation, Tokyo (JP)

(72) Inventor: Masaaki Togashi, Nikaho (JP)

(73) Assignee: TDK Corporation, Tokyo (JP)

( * ) Notice: Subject to any disclaimer, the term of this patent is extended or adjusted under 35 U.S.C. 154(b) by 31 days.

(21) Appl. No.: 13/958,919

(22) Filed: Aug. 5, 2013

(65) Prior Publication Data

US 2014/0043719 A1  Feb. 13, 2014

(30) Foreign Application Priority Data

Aug. 10, 2012 (JP) .................................. 2012-178607

(51) Int. Cl.
*H01G 4/005* (2006.01)
*H01G 4/38* (2006.01)

(52) U.S. Cl.
CPC .............. *H01G 4/005* (2013.01); *H01G 4/385* (2013.01)

(58) Field of Classification Search
CPC ............................... H01G 4/005; H01G 4/385
USPC .................................... 361/303, 321.2, 301.4
See application file for complete search history.

(56) References Cited

U.S. PATENT DOCUMENTS

| | | | | |
|---|---|---|---|---|
| 6,661,640 | B2 * | 12/2003 | Togashi | 361/306.3 |
| 7,307,829 | B1 * | 12/2007 | Devoe et al. | 361/328 |
| 7,394,646 | B2 * | 7/2008 | Tonogai et al. | 361/311 |
| 2011/0102969 | A1 * | 5/2011 | Togashi | 361/306.3 |
| 2012/0019978 | A1 * | 1/2012 | Yoshida | 361/301.4 |
| 2012/0112855 | A1 * | 5/2012 | Sato et al. | 333/174 |

FOREIGN PATENT DOCUMENTS

JP 11026295 A * 1/1999
JP A-2012-44148 3/2012

* cited by examiner

*Primary Examiner* — David M Sinclair
(74) *Attorney, Agent, or Firm* — Oliff PLC

(57) ABSTRACT

Provided is a laminated capacitor that achieves low impedance in a wide band. The laminated capacitor 1 includes an element assembly 2, terminal electrodes 3, 4, internal electrodes 7, 8 that are connected to the terminal electrodes 3, 4, and an internal electrode 9 that is not connected to the terminal electrodes 3, 4. In the laminated capacitor 1, an interval between each of the first electrode parts 3a, 4a of the first and second terminal electrodes 3, 4 and the internal electrode 9 is smaller than an interval between the internal electrode 9 and the internal electrode 7 or the internal electrode 8 located adjacent to the internal electrode 9.

7 Claims, 8 Drawing Sheets

LAMINATED CAPACITOR HAVING INTERNAL ELECTRODE CONNECTED TO TERMINAL ELECTRODE AND INTERNAL ELECTRODE NOT CONNECTED TO TERMINAL ELECTRODE

BACKGROUND OF THE INVENTION

1. Field of the Invention

The present invention relates to a laminated capacitor.

2. Related Background Art

As a conventional laminated capacitor, for example, one described in Japanese Patent Application Laid-Open No. 2012-44148 has been known. The laminated capacitor described in Japanese Patent Application Laid-Open No. 2012-44148 includes a rectangular parallelepiped-shaped ceramic element assembly having first and second main surfaces extending along a length direction and width direction thereof, first and second side surfaces extending along a length direction and thickness direction thereof, and first and second end surfaces extending along a width direction and thickness direction thereof, first and second internal electrodes that are disposed in the element assembly, and terminal electrodes disposed over the end surfaces and main surfaces of the element assembly. This laminated capacitor is configured as a low-profile capacitor.

It is an object of the present invention to provide a laminated capacitor capable of obtaining low impedance characteristics over a wide band.

SUMMARY OF THE INVENTION

An aspect of the present invention is a laminated capacitor including an element assembly having a pair of first and second end surfaces opposed to each other, a pair of first and second main surfaces extending so as to connect between a pair of the first and second end surfaces and opposed to each other, and a pair of first and second side surfaces extending so as to connect a pair of the first and second main surfaces and opposed to each other, first and second terminal electrodes disposed on both end portions of the element assembly, and each having a first electrode part located on at least the first main surface, first and second internal electrodes that are connected to corresponding terminal electrodes out of the first and second terminal electrodes, and disposed in the element assembly so as to be opposed to each other in a first direction in which the first main surface and the second main surface are opposed, and a third internal electrode that is disposed in the element assembly so as to be located, adjacent to the first main surface, outside in the first direction further than the first and second internal electrodes and be opposed to each of the first electrode parts of the first and second terminal electrodes, and not connected to the first and second terminal electrodes, in which a first capacitance unit composed of the first internal electrode and the second internal electrode, a second capacitance unit composed of the first electrode part of the first terminal electrode and the third internal electrode, and a third capacitance unit composed of the first electrode part of the second terminal electrode and the third internal electrode are formed, and an interval between each of the first electrode parts of the first and second terminal electrodes and the third internal electrode is smaller than an interval between the third internal electrode and the first internal electrode or the second internal electrode located adjacent to the third internal electrode.

This laminated capacitor has a first capacitance unit composed of the first internal electrode and the second internal electrode, a second capacitance unit composed of the first electrode part of the first terminal electrode and the third internal electrode, and a third capacitance unit composed of the first electrode part of the second terminal electrode and the third internal electrode. Thus, as a result of having a plurality of capacitance units and these capacitance units being connected in series and parallel, low impedance can be realized over a wide band. Moreover, the interval between each of the first electrode parts of the first and second terminal electrodes and the third internal electrode is made smaller than the interval between the third internal electrode and the first internal electrode or the second internal electrode located adjacent to the third internal electrode, and in the second and third capacitance units consisting of the first and second terminal electrodes disposed on the main surface to serve as a mounting surface and the third internal electrode that is disposed at a position close to the terminal electrodes, the equivalent series inductance (hereinafter, referred to as ESL) is lowered. As a result, a lowered impedance can be favorably realized over a wide band.

Further, in the laminated capacitor, when the first main surface is used as a mounting surface, because the third internal electrode is disposed closer to the first main surface, even if, for example, a crack occurs in the first and second terminal electrodes when the laminated capacitor is mounted, the influence on the first and second internal electrodes can be reduced, so that a short-circuit failure can be suppressed. Moreover, even if a crack occurs in the third internal electrode to disable either one of the second capacitance unit and the third capacitance unit from functioning, the other can secure the function, so that reliability such as insulation resistance can be improved.

In an embodiment, there may be an arrangement such that each of the first and second terminal electrodes has a second electrode part located on the second main surface, the laminated capacitor includes a fourth internal electrode that is disposed in the element assembly so as to be located, adjacent to the second main surface, outside in the first direction further than the first and second internal electrodes and be opposed to each of the second electrode parts of the first and second terminal electrodes, and not connected to the first and second terminal electrodes, the second capacitance unit is composed of the first and second electrode parts of the first terminal electrode and the third and fourth internal electrodes, the third capacitance unit is composed of the first and second electrode parts of the second terminal electrode and the third and fourth internal electrodes, and an interval between each of the second electrode parts of the first and second terminal electrodes and the fourth internal electrode is smaller than an interval between the fourth internal electrode and the first internal electrode or the second internal electrode located adjacent to the fourth internal electrode. Thus, as a result of further including a fourth internal electrode and securing capacitance of the second and third capacitance units, low ESL can be realized, and low impedance can be more favorably achieved over a wide band.

In an embodiment, the first and second internal electrodes may show substantially rectangular shapes when viewed from the first direction, and an interval t1 between each of the first electrode parts of the first and second terminal electrodes and the third internal electrode, an interval t2 between each of the second electrode parts of the first and second terminal electrodes and the fourth internal electrode, a length w of the third and fourth internal electrodes in a second direction in which the first side surface and the second side surface are opposed, and a separation distance g between the first terminal electrode and the second terminal electrode in a third direction in which the first end surface and the second end surface are opposed may have a relationship that satisfies:

$(t1 \times g)/w \leq 0.025$ (mm)

$(t2 \times g)/w \leq 0.025$ (mm).

Thus, in the laminated capacitor, as a result of satisfying the relationship of $(t1 \times g)/w \leq 0.025$ (mm) and $(t2 \times g)/w \leq 0.025$ (mm), the ESL can be lowered.

In an embodiment, there may be an arrangement such that the element assembly has a dimension between the first and second main surfaces smaller than a dimension between the first and second end surfaces and a dimension between the first and second side surfaces. Thus, providing the laminated capacitor as a so-called low-profile type laminated capacitor enables integration into a substrate and embedding into an LSI (Large Scale Integration). Moreover, in a structure where the laminated capacitor is embedded, a terminal electrode on the first or second main surface and a via conductor is connected. In this mounting structure, because the terminal electrode has a short current loop distance, low ESL can be realized.

In an embodiment, there may be an arrangement such that the third and fourth internal electrodes are disposed one each. Thus, disposing only the third and fourth internal electrodes that serve as constituents of a capacitance unit and not disposing unnecessary internal electrodes that do not serve as constituents of a capacitance unit allows reliably forming a capacitance unit while simplifying the configuration.

In an embodiment, there may be an arrangement such that the separation distance g between the first terminal electrode and the second terminal electrode is shorter than a length in the third direction of each of the first and second terminal electrodes. According to this arrangement, the length of the first and second terminal electrodes is long, which allows securing an opposing area between the first and second terminal electrodes and the third and fourth internal electrodes, so that capacitance can be secured in the first and second terminal electrodes and the third and fourth internal electrodes. Further, because the separation distance g between the terminal electrodes to have opposite polarities is small, low ESL can be achieved.

In an embodiment, the first terminal electrode and the second terminal electrode may be further disposed on the first and second side surfaces, the first internal electrode may have a first main electrode portion extending in a third direction in which the first end surface and the second end surface are opposed and a first lead-out electrode portion extending in a second direction in which the first side surface and the second side surface are opposed, and the second internal electrode may have a second main electrode portion extending in the third direction and a second lead-out electrode portion extending in the second direction. In this arrangement, because the distance between the first lead-out electrode portion and the second lead-out electrode portion can be small, low ESL can be achieved.

In an embodiment, the interval t1 between each of the first electrode parts and the third internal electrode and the interval t2 between each of the second electrode parts and the fourth internal electrode may be 0.012 mm or more. According to this arrangement, a problem such that the third and fourth internal electrodes are exposed from the element assembly can be prevented.

In an embodiment, the separation distance g between the first terminal electrode and the second terminal electrode may be 0.15 mm or more. According to this arrangement, a mounting failure can be suppressed when the laminated capacitor is mounted.

According to the present invention, low impedance can be achieved over a wide band.

DESCRIPTION OF THE PREFERRED EMBODIMENTS

Hereinafter, preferred embodiments of the present invention will be described in detail with reference to the accompanying drawings. The same or corresponding components are denoted by the same reference signs in the description of the drawings, and overlapping description will be omitted.

Figure 1:
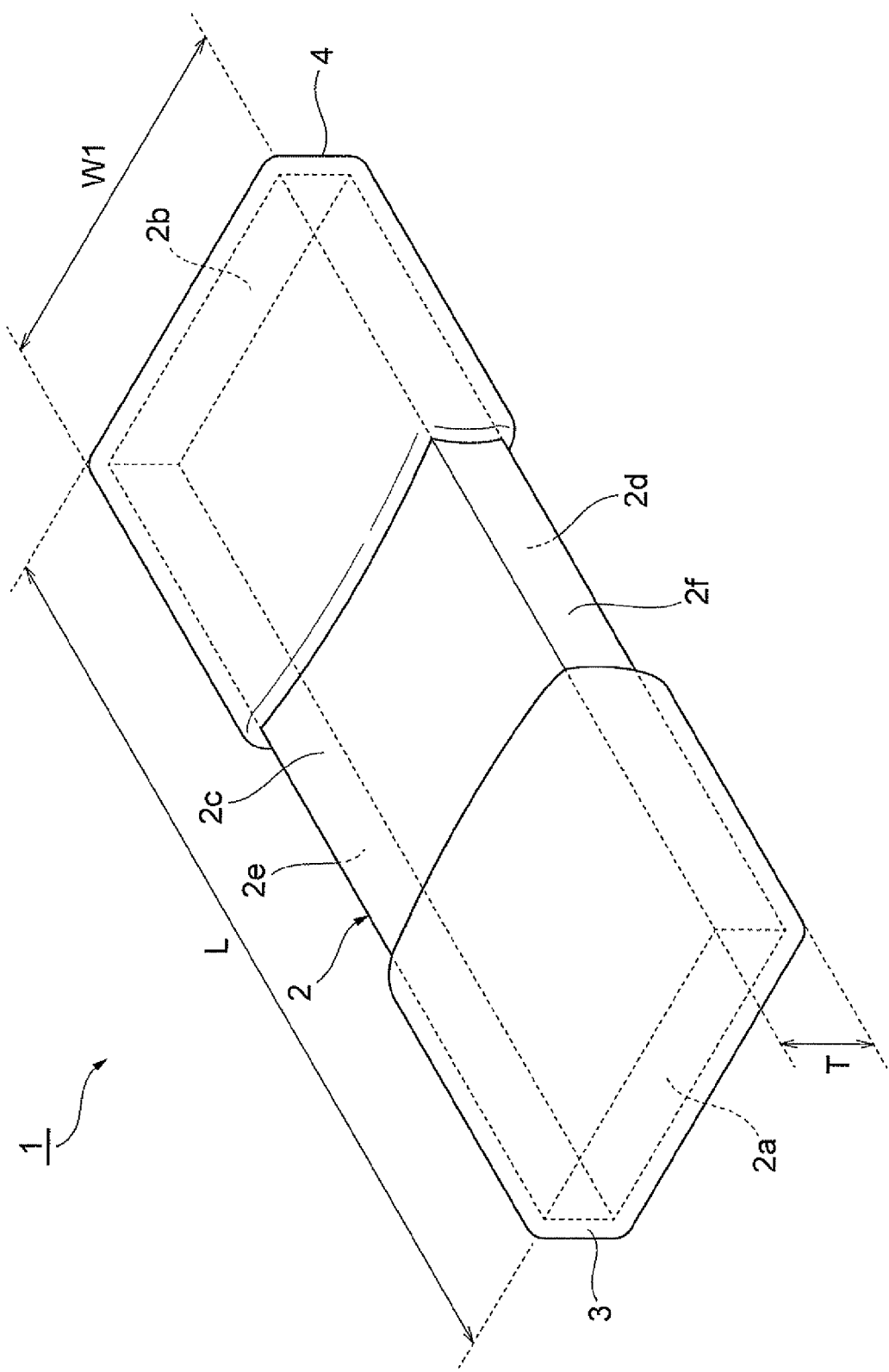
FIG. 1 is a perspective view showing a laminated capacitor according to an embodiment.
Figure 2:
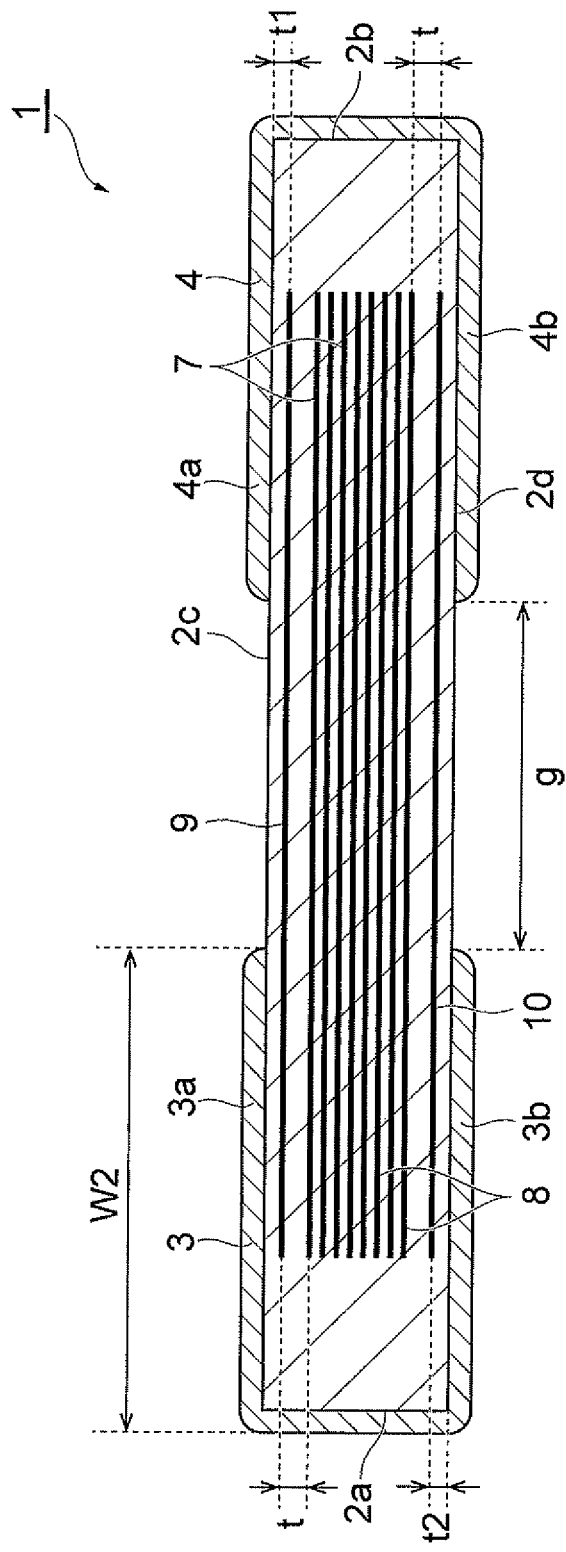
FIG. 2 is a view showing a sectional configuration of the laminated capacitor.
Figure 3:
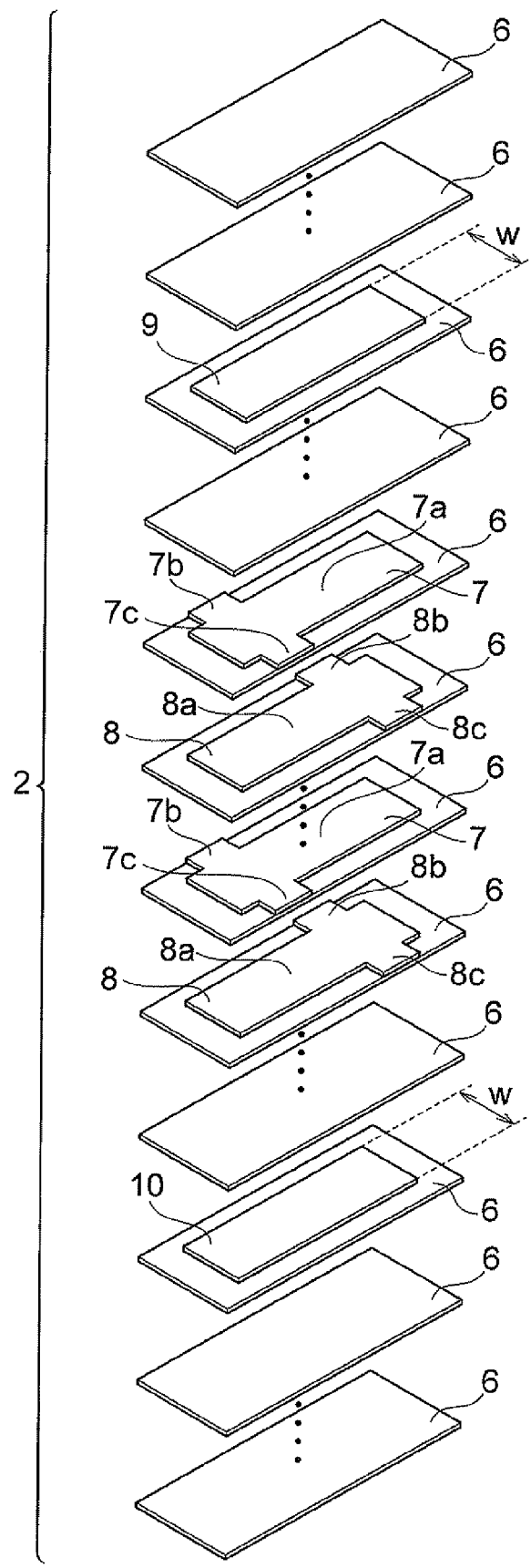
FIG. 3 is an exploded perspective view showing a configuration of an element assembly.

FIG. 1 is a perspective view showing a laminated capacitor according to an embodiment. FIG. 2 is a view showing a sectional configuration of the laminated capacitor. FIG. 3 is an exploded perspective view showing a configuration of an element assembly.

As shown in FIG. 1, the laminated capacitor 1 is constructed including an element assembly 2 formed in a substantially rectangular parallelepiped shape, internal electrodes (a first internal electrode, a second internal electrode, a third internal electrode, a fourth internal electrode) 7, 8, 9, 10 disposed in the element assembly 2, and first and second terminal electrodes 3, 4 formed on both end surface sides of the element assembly 2. The laminated capacitor 1 is set to, for example, a length L of approximately 0.95 mm to 1.05 mm, a width W1 of approximately 0.45 mm to 0.55 mm, and a height T of approximately 0.09 mm to 0.22 mm. The laminated capacitor 1 is configured as a so-called low-profile type capacitor.

The element assembly 2 has a pair of first and second end surfaces 2a, 2b facing in the longitudinal direction of the element assembly 2 to be parallel to each other, a pair of first and second main surfaces 2c, 2d extending so as to connect between the first and second end surfaces 2a, 2b and opposed to each other, and a pair of first and second side surfaces 2e, 2f extending so as to connect the first and second main surfaces 2c, 2d and opposed to each other. The element assembly 2 has a dimension between the first and second main surfaces 2c, 2d that is smaller than a dimension between the first and second end surfaces 2a, 2b and a dimension between the first and second side surfaces 2e, 2f.

The element assembly 2 is formed, as shown in FIG. 2 and FIG. 3, as a lamination for which a plurality of rectangular plate-shaped dielectric layers 6 and pluralities of internal electrodes 7 and internal electrodes 8 are laminated. The internal electrodes 7 and the internal electrodes 8 are disposed in the element assembly 2 one each for each layer along a lamination direction of the dielectric layers 6, that is, a first direction in which the first main surface 2c and the second main surface 2d of the element assembly 2 are opposed (hereinafter, simply referred to as a first direction). The internal electrode 7 and the internal electrode 8 are disposed opposed so as to sandwich at least one dielectric layer 6. In an actual laminated capacitor 1, the plurality of dielectric layers 6 are integrated to such an extent that boundaries with each other are not visible.

The first terminal electrode 3 is disposed so as to cover the first end surface 2a, a part of each edge portion of the first and second main surfaces 2c, 2d, and first and second side surfaces 2e, 2f. That is, the terminal electrode 3 is disposed over the first end surface 2a, the first and second main surfaces 2c, 2d, and the first and second side surfaces 2e, 2f. The first terminal electrode 3 has a first electrode part 3a located on the first main surface 2c and a second electrode part 3b located on the second main surface 2d.

The second terminal electrode 4 is disposed so as to cover the second end surface 2b, a part of each edge portion of the first and second main surfaces 2c, 2d, and the first and second side surfaces 2e, 2f. That is, the terminal electrode 4 is disposed over the second end surface 2b, the first and second main surfaces 2c, 2d, and the first and second side surfaces 2e, 2f. The second terminal electrode 4 has a first electrode part 4a located on the first main surface 2c and a second electrode part 4b located on the second main surface 2d. As shown in FIG. 2, the separation distance g between the first terminal electrode 3 and the second terminal electrode 4 is smaller than the length (width) W2 in the opposing direction of the first and second end surfaces 2a, 2b of the terminal electrodes 3, 4.

The internal electrode 7 has a first main electrode portion 7a extending in a third direction in which the first end surface 2a and the second end surface 2b are opposed (hereinafter, simply referred to as a third direction) and first lead-out electrode portions 7b, 7c extending in a second direction in which the first side surface 2e and the second side surface 2f are opposed (hereinafter, simply referred to as a second direction). The first main electrode portion 7a shows a substantially rectangular shape. Each of the first lead-out electrode portions 7b, 7c is led out from one side of the first main electrode portion 7a, and is exposed to each of the first and second side surfaces 2e, 2f to be connected to the first terminal electrode 3. Accordingly, the internal electrode 7 and the terminal electrode 3 are electrically connected.

The internal electrode 8 has a second main electrode portion 8a extending in the third direction and second lead-out electrode portions 8b, 8c extending in the second direction. The second main electrode portion 8a shows a substantially rectangular shape. Each of the second lead-out electrode portions 8b, 8e is led out from one side of the second main electrode portion 8a, and is exposed to each of the first and second side surfaces 2e, 2f to be connected to the second terminal electrode 4.

Accordingly, the internal electrode 8 and the terminal electrode 4 are electrically connected.

Figure 4:
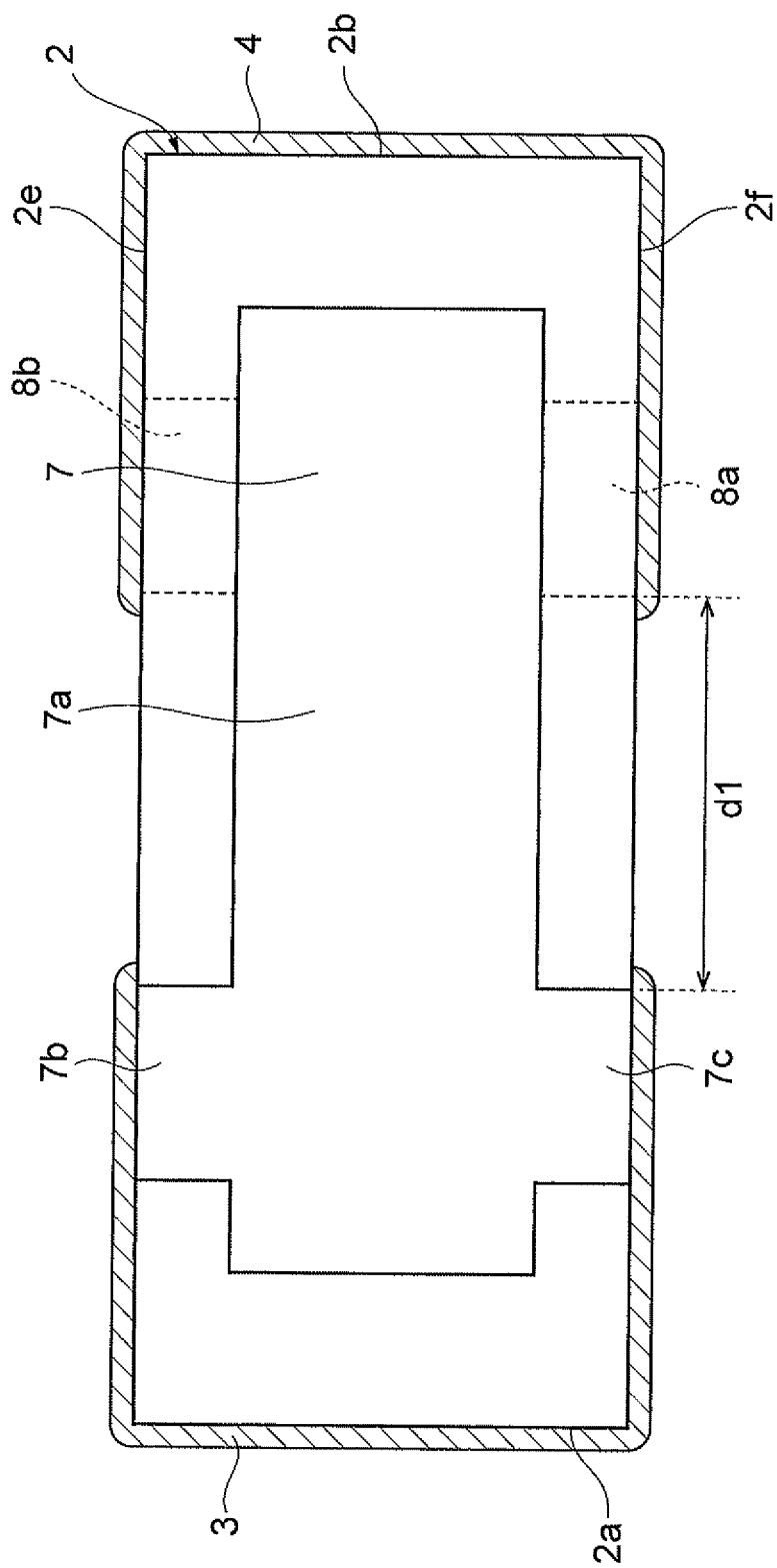
FIG. 4 is a sectional view showing internal electrodes.

FIG. 4 is a sectional view showing internal electrodes. As shown in FIG. 4, the shorter the separation distance dl between the first lead-out electrode portion 7c (7b) and the second lead-out electrode portion 8c (8b), the more preferable from the viewpoint of low ESL. The shorter the separation distance dl, the lower the ESL becomes. Therefore, it is preferable that the separation distance di is, for example, approximately 0.3 mm.

In the present embodiment, there is further disposed an internal electrode 9 and an internal electrode 10 in the element assembly 2. The internal electrode 9 shows a substantially rectangular shape, and is located outside in the first direction further than the internal electrodes 7, 8 and closer to the main surface 2c. The internal electrode 9 is disposed opposed to the first electrode part 3a of the first terminal electrode 3 and the first electrode part 4a of the second terminal electrode 4. The internal electrode 9 is an electrode that is not electrically connected to the first and second terminal electrodes 3, 4, and is a floating electrode.

The internal electrode 10 shows a substantially rectangular shape, and is located on the outside in the first direction further than the internal electrodes 7, 8 and closer to the main surface 2d. The internal electrode 10 is disposed opposed to the second electrode part 3b of the first terminal electrode 3 and the second electrode part 4b of the second terminal electrode 4. The internal electrode 10 is an electrode that is not electrically connected to the first and second terminal electrodes 3, 4, and is a floating electrode. The internal electrodes 9, 10 are disposed one each in the element assembly 2.

In the laminated capacitor 1 having the above-described configuration, the interval t1 between each of the first electrode parts 3a, 4a of the first and second terminal electrodes 3, 4 and the internal electrode 9 and the interval t2 between each of the second electrode parts 3b, 4b of the first and second terminal electrodes 3, 4 and the internal electrode 10 are smaller than the interval t between the internal electrode 9 and the internal electrode 7 located adjacent to the internal electrode 9 and the interval t between the internal electrode 10 and the internal electrode 8 located adjacent to the internal electrode 10.

Moreover, in the laminated capacitor 1 having the above-described configuration, the relationship of the following expression (1) and (2) are satisfied.

$$(t1 \times g)/w \leq 0.025 \text{ (mm)} \tag{1}$$

$$(t2 \times g)/w \leq 0.025 \text{ (mm)} \tag{2}$$

In the above-described expressions (1), (2), t1 represents the interval between the internal electrode 9 and the first electrode parts 3a, 4a of the first and second terminal electrodes 3, 4 (refer to FIG. 2), t2 represents the interval between the internal electrode 10 and the second electrode parts 3b, 4b of the first and second terminal electrodes 3, 4, g represents separation distance between the first terminal electrode 3 and the second terminal electrode 4 in the third direction (refer to FIG. 2), and w represents the length in the second direction of the internal electrodes 9, 10 (refer to FIG. 3). In addition, the separation distance g is a distance between positions where the first terminal electrode 3 and the second terminal electrode 4 are closest to each other, connected by a straight line along the opposing direction of the first and second end surfaces 2a, 2b.

Figure 5:
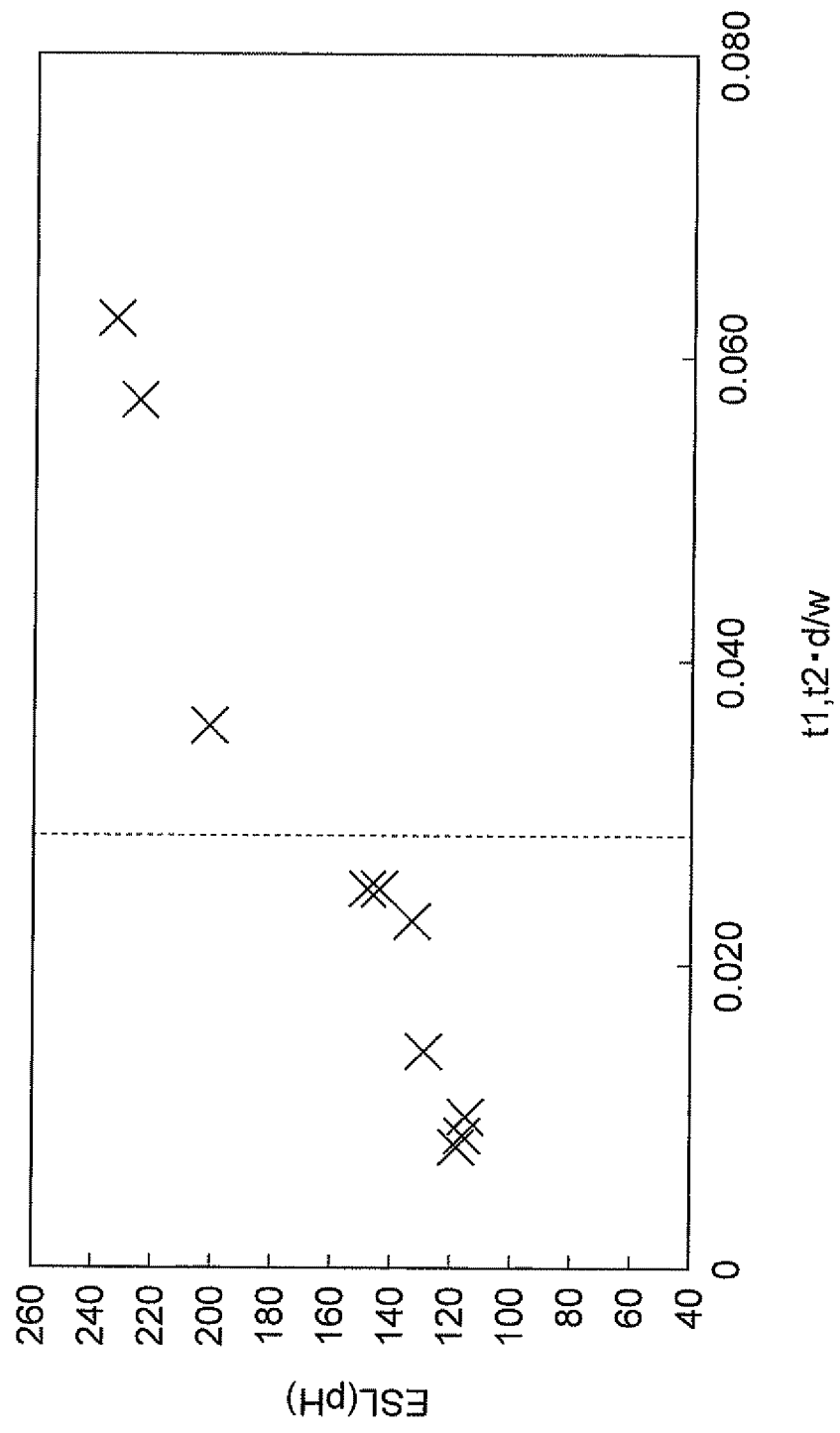
FIG. 5 is a graph showing a relationship between the dimensions of respective portions and ESL.

FIG. 5 is a graph showing a relationship between the dimensions of respective portions and ESL. In FIG. 5, the horizontal axis shows numerical values of (t1, t2×d)/w, and the longitudinal axis shows ESL [pH]. As shown in FIG. 5, when the above-described expressions (1), (2) are satisfied, that is, when the value of each of (t1×g)/w and (t2×g)/w is 0.025 or less, low ESL can be achieved.

In addition, it is preferable that the interval t1 between the internal electrode 9 and the first electrode parts 3a, 4a of the first and second terminal electrodes 3, 4 and the interval t2 between the internal electrode 10 and the second electrode parts 3b, 4b of the first and second terminal electrodes 3, 4 are 0.012 mm or more (t1, t2≥0.012 mm). If these intervals t1, t2 are smaller than 0.012 mm, the internal electrodes 9, 10 are likely to be exposed from the element assembly 2. Therefore, by setting the intervals t1, t2 to 0.012 mm or more, a problem such that the internal electrodes 9, 10 are exposed from the element assembly 2 can be prevented.

Moreover, it is preferable that the separation distance g between the first terminal electrode 3 and the second terminal electrode 4 is 0.15 mm or more (g≥0.15 mm). If this separation distance g is smaller than 0.15 mm, a mounting failure is likely to occur when the laminated capacitor 1 is mounted (for example, a short circuit between the first terminal electrode 3 and the second terminal electrode 4 when being solder-mounted). Therefore, by setting the separation distance g to 0.15 mm or more, a mounting failure of the laminated capacitor 1 can be suppressed.

Figure 6:
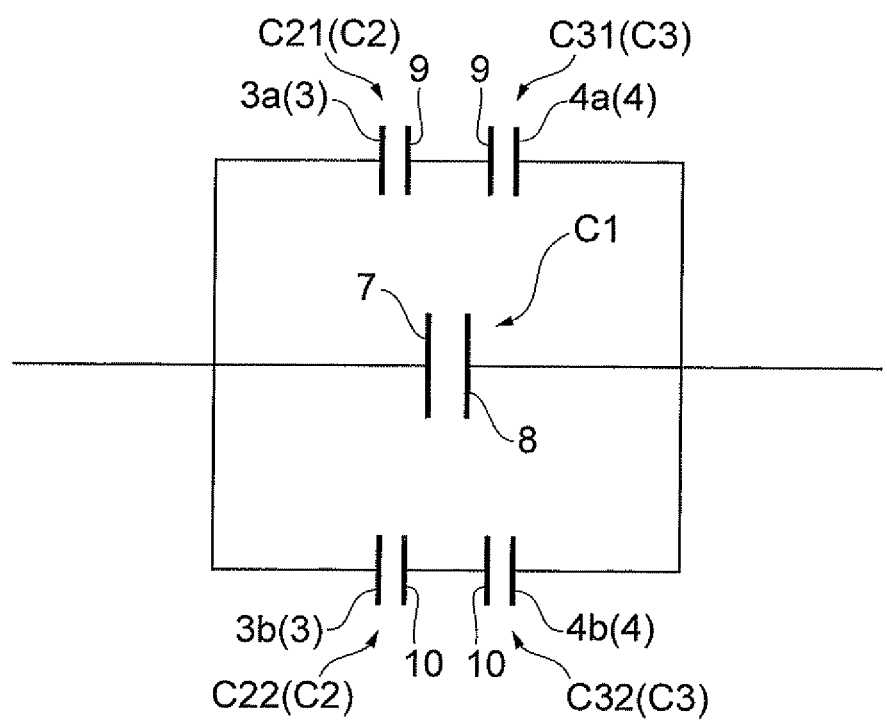
FIG. 6 is a circuit diagram of the laminated capacitor.

FIG. 6 is a circuit diagram of the laminated capacitor. As shown in FIG. 6, the element assembly 2 of the laminated capacitor 1 has a first capacitor unit (a first capacitance unit) C1 consisting of the internal electrode 7 and the internal electrode 8, a second capacitor unit (a second capacitance unit) C2 consisting of the terminal electrode 3 and the internal electrodes 9, 10, and a third capacitor unit (a third capacitance unit) C3 consisting of the terminal electrode 4 and the internal electrodes 9, 10.

In the second capacitor unit C2, a capacitor C21 composed of the first electrode part 3a of the terminal electrode 3 and the internal electrode 9 and a capacitor C22 composed of the second electrode part 3b of the terminal electrode 3 and the internal electrode 10 are connected in parallel. In the third capacitor unit C3, a capacitor C31 composed of the first electrode part 4a of the terminal electrode 4 and the internal electrode 9 and a capacitor C32 composed of the second electrode part 4b of the terminal electrode 4 and the internal electrode 10 are connected in parallel.

The capacitor C21 and the capacitor C31 are connected in series, and the capacitor C22 and the capacitor C32 are connected in series.

That is, the second capacitor unit C2 and the third capacitor unit C3 are connected in series to form a series circuit. Moreover, the first capacitor unit C1 and the second capacitor unit C2 and the third capacitor unit C3 are connected in parallel to form a parallel circuit.

Figure 7:
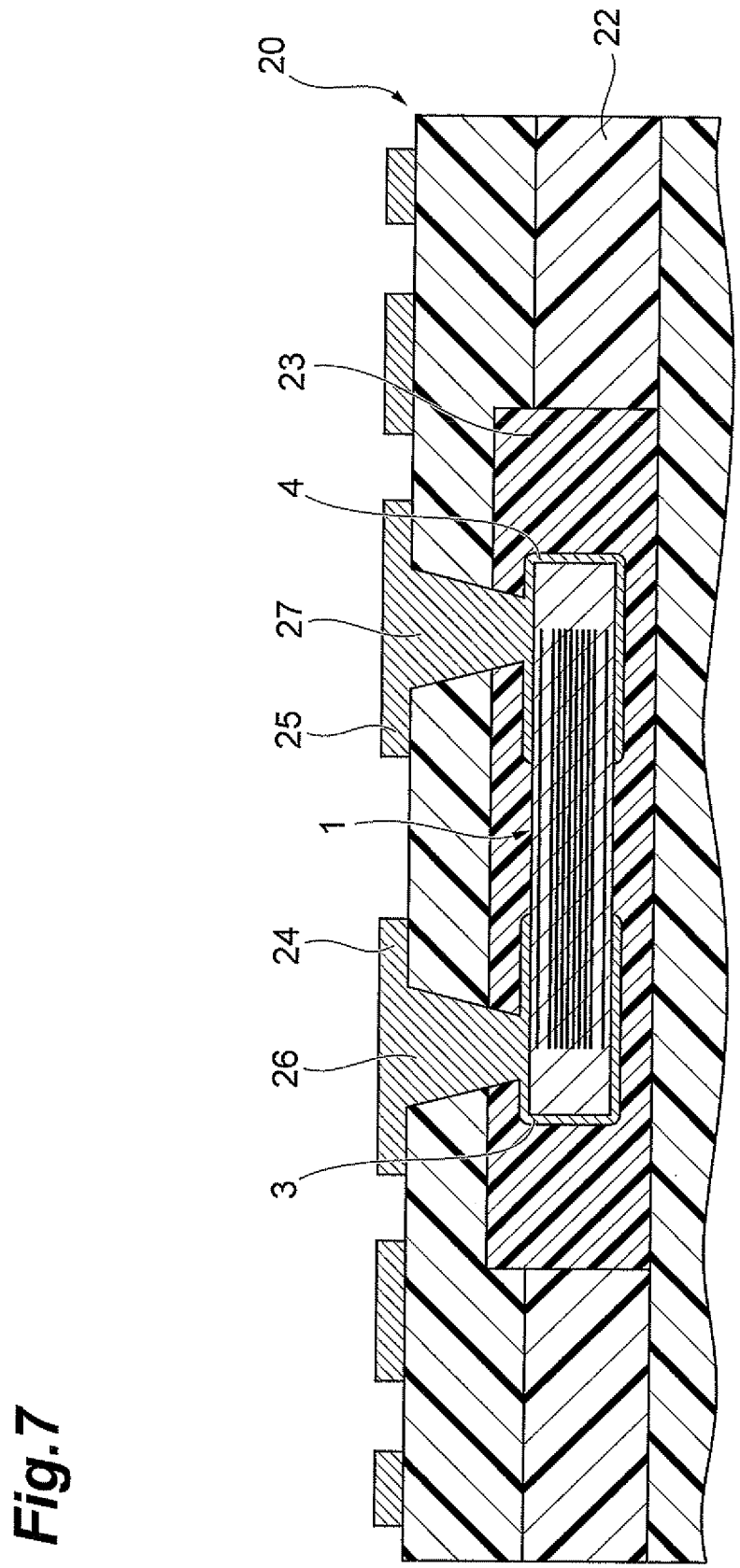
FIG. 7 is a sectional view showing a mounting structure of the laminated capacitor.

FIG. 7 is a sectional view showing a mounting structure of the laminated capacitor. As shown in FIG. 7, the laminated capacitor 1 is mounted by being embedded in a substrate 20. The substrate 20 is composed of a plurality of laminated insulating resin sheets 22. The laminated capacitor 1 is disposed in the substrate 20, and embedded inside the substrate 20 by being filled with a resin 23. The laminated capacitor 1 is electrically connected by via conductors 26, 27 with electrodes 24, 25 formed on the surface of the substrate 20.

Specifically, to the first terminal electrode 3, the via conductor 26 is connected physically and electrically. At this time, because the first terminal electrode 3 is disposed on the main surface 2c of the element assembly 2, the connection between the first terminal electrode 3 and the via conductor 26 can be reliably performed. Accordingly, the first terminal electrode 3 and the electrode 24 are electrically connected. To the second terminal electrode 4, the via conductor 27 is connected physically and electrically. At this time, because the second terminal electrode 4 is disposed on the main surface 2c of the element assembly 2, the connection between the second terminal electrode 4 and the via conductor 27 can be reliably performed. Accordingly, the second terminal electrode 4 and the electrode 25 are electrically connected.

As described above, in the present embodiment, the element assembly 2 has a first capacitor unit C1, a second capacitor unit C2, and a third capacitor unit C3, and the first to third capacitor units C1 to C3 are connected in parallel. Thus, as a result of the plurality of capacitor units C1 to C3 being connected in series and parallel, low impedance in a wide band can be achieved in the low-profile type laminated capacitor 1.

Moreover, in the present embodiment, the interval t1 between each of the first electrode parts 3a, 4a of the first and second terminal electrodes 3, 4 and the internal electrode 9 and the interval t2 between each of the second electrode parts 3b, 4b of the first and second terminal electrodes 3, 4 and the internal electrode 10 are smaller than the interval t between the internal electrode 9 and the internal electrode 7 located adjacent to the internal electrode 9 and the interval t between the internal electrode 10 and the internal electrode 8 located adjacent to the internal electrode 10. Thus, in the second and third capacitor units C2, C3 consisting of the first and second terminal electrodes 3, 4 disposed on the first or second main surface 2c, 2d to serve as a mounting surface and the internal electrodes 9, 10 that are disposed at positions close to the terminal electrodes 3, 4, the ESL is lowered. As a result, a lowered impedance can be favorably realized over a wide band. Further, in the laminated capacitor 1, because the internal electrodes 9, 10 are disposed closer to the first and second main surfaces 2c, 2d, respectively, either of which serves as a mounting surface, even if, for example, a crack of the element assembly 2 occurs when the laminated capacitor 1 is mounted, the influence on the internal electrodes 7, 8 can be reduced, so that a short-circuit failure can be suppressed.

Moreover, in the present embodiment, even if, for example, a crack occurs in the internal electrodes 9, 10 to disable either one of the second capacitor unit C2 and the third capacitor unit C3 from functioning, the other can secure the function, so that reliability such as insulation resistance can be improved.

Moreover, in the present embodiment, the interval t1, t2 between the internal electrode 9, 10 and the terminal electrodes 3, 4 on the main surface 2c, 2d, the separation distance g between the first terminal electrode 3 and the second terminal electrode 4 in the opposing direction of the first and second end surfaces 2a, 2b, and the width dimension w in the opposing direction of the first and second side surfaces 2e, 2f of the internal electrodes 9, 10 satisfy the relationship of:

$$(t1 \times g)/w \leq 0.025 \text{ (mm)} \tag{1}$$

$$(t2 \times g)/w \leq 0.025 \text{ (mm)} \tag{2}$$

Thus, as a result of setting the dimensions of the respective portions so as to satisfy the expressions (1), (2), the ESL can be lowered. Accordingly, low impedance in a wide band can be more favorably achieved.

Moreover, in the present embodiment, the separation distance g between the first terminal electrode 3 and the second terminal electrode 4 is shorter than the length (width) W2 in the third direction of the first and second terminal electrodes 3, 4. According to this arrangement, the length of the first and second terminal electrodes 3, 4 is long, which allows securing an opposing area between the first and second terminal electrodes 3, 4 and the internal electrodes 9, 10, so that capacitance can be secured. Further, because the separation distance g between the first terminal electrode 3 and the second terminal electrode 4 to have opposite polarities is small, the ESL can be lowered.

Moreover, in the present embodiment, the internal electrodes 9, 10 are disposed one each in the element assembly 2. Thus, solely disposing a floating electrode that serves as a constituent of a capacitor unit allows reliably forming a capacitor unit while simplifying the configuration.

Figure 8:
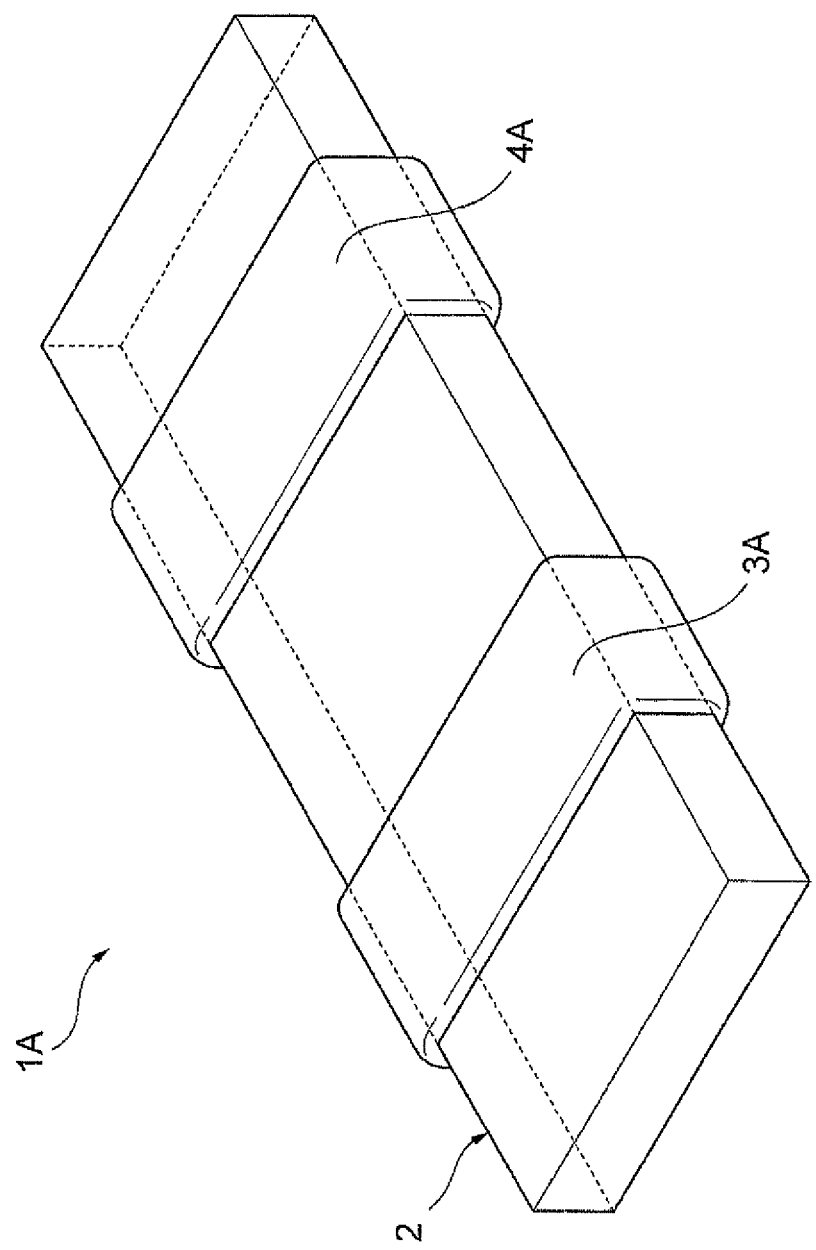
FIG. 8 is a perspective view showing a laminated capacitor according to another embodiment.

The present invention is not limited to the above-described embodiment. For example, in the above-described embodiment, a description has been given of, as an example, the configuration where the first and second terminal electrodes 3, 4 are disposed so as to cover the end surfaces 2a, 2b, the main surfaces 2c, 2d, and the side surfaces 2e, 2f of the element assembly 2, but the terminal electrodes may have such a configuration as shown in FIG. 8, for example. FIG. 8 is a perspective view showing a laminated capacitor according to another embodiment.

As shown in FIG. 8, the laminated capacitor 1A includes first and second terminal electrodes 3A, 4A. The first terminal electrode 3A is disposed on the first main surface 2c, 2d and the first and second side surfaces 2e, 2f of the element assembly 2. In other words, the first terminal electrode 3A is not disposed on the first end surface 2a. The second terminal electrode 4A is disposed on the first main surface 2c, 2d and the first and second side surfaces 2e, 2f of the element assembly 2. In other words, the second terminal electrode 4A is not disposed on the second end surface 2b.

Moreover, in the above-described embodiment, a description has been given of, as an example, the low-profile type laminated capacitor 1, 1A, but the laminated capacitor 1, 1A are not necessarily a low-profile type. Moreover, the shapes of the internal electrodes 7, 8 may be other shapes.

What is claimed is:

1. A laminated capacitor comprising:
   an element assembly having a pair of first and second end surfaces opposed to each other, a pair of first and second main surfaces extending so as to connect between a pair of the first and second end surfaces and opposed to each other, and a pair of first and second side surfaces extending so as to connect a pair of the first and second main surfaces and opposed to each other;
   first and second terminal electrodes disposed on both end portions of the element assembly, and each having a first electrode part located on at least the first main surface;
   first and second internal electrodes that are connected to corresponding terminal electrodes out of the first and second terminal electrodes, and disposed in the element assembly so as to be opposed to each other in a first direction in which the first main surface and the second main surface are opposed; and
   a third internal electrode that is disposed in the element assembly so as to be located, adjacent to the first main surface, outside in the first direction further than the first and second internal electrodes and be opposed to each of the first electrode parts of the first and second terminal electrodes, and not connected to the first and second terminal electrodes, wherein
   a first capacitance unit composed of the first internal electrode and the second internal electrode, a second capacitance unit composed of the first electrode part of the first terminal electrode and the third internal electrode, and a third capacitance unit composed of the first electrode part of the second terminal electrode and the third internal electrode are formed,
   an interval between each of the first electrode parts of the first and second terminal electrodes and the third internal electrode is smaller than an interval between the third internal electrode and the first internal electrode or the second internal electrode located adjacent to the third internal electrode,
   each of the first and second terminal electrodes has a second electrode part located on the second main surface,
   the laminated capacitor includes a fourth internal electrode that is disposed in the element assembly so as to be located, adjacent to the second main surface, outside in the first direction further than the first and second internal electrodes and be opposed to each of the second electrode parts of the first and second terminal electrodes, and not connected to the first and second terminal electrodes,
   the second capacitance unit is composed of the first and second electrode parts of the first terminal electrode and the third and fourth internal electrodes,
   the third capacitance unit is composed of the first and second electrode parts of the second terminal electrode and the third and fourth internal electrodes,
   an interval between each of the second electrode parts of the first and second terminal electrodes and the fourth internal electrode is smaller than an interval between the fourth internal electrode and the first internal electrode or the second internal electrode located adjacent to the fourth internal electrode,
   the first and second internal electrodes show substantially rectangular shapes when viewed from the first direction, and
   an interval t1 between each of the first electrode parts of the first and second terminal electrodes and the third internal electrode, an interval t2 between each of the second electrode parts of the first and second terminal electrodes and the fourth internal electrode, a length w of the third and fourth internal electrodes in a second direction in which the first side surface and the second side surface are opposed, and a separation distance a between the first terminal electrode and the second terminal electrode in a third direction in which the first end surface and the second end surface are opposed have a relationship that satisfies:

$$(t1 \times g)/w \leq 0.025 \text{ (mm)}$$

$$(t2 \times g)/w \leq 0.025 \text{ (mm)}$$

2. The laminated capacitor according to claim 1, wherein the element assembly has a dimension between the first and second main surfaces smaller than a dimension between the first and second end surfaces and a dimension between the first and second side surfaces.

3. The laminated capacitor according to claim 1, wherein the third and fourth internal electrodes are disposed one each.

4. The laminated capacitor according to claim 1, wherein the separation distance g between the first terminal electrode and the second terminal electrode is shorter than a length in the third direction of each of the first and second terminal electrodes.

5. The laminated capacitor according to claim 1, wherein
   the first terminal electrode and the second terminal electrode are further disposed on the first and second side surfaces,
   the first internal electrode has a first main electrode portion extending in a third direction in which the first end surface and the second end surface are opposed and a first lead-out electrode portion extending in a second direction in which the first side surface and the second side surface are opposed, and
   the second internal electrode has a second main electrode portion extending in the third direction and a second lead-out electrode portion extending in the second direction.

6. The laminated capacitor according to claim 1, wherein the interval t1 between each of the first electrode parts and the third internal electrode and the interval t2 between each of the second electrode parts and the fourth internal electrode are 0.012 mm or more.

7. The laminated capacitor according to claim 1, wherein the separation distance g between the first terminal electrode and the second terminal electrode is 0.15 mm or more.

\* \* \* \* \*